United States Patent [19]
Wareham et al.

[11] 3,810,211
[45] May 7, 1974

[54] SELF-DEVELOPING CAMERA SYSTEM

[75] Inventors: Richard R. Wareham, Marblehead; Richard Paglia, Carlisle, both of Mass.

[73] Assignee: Polaroid Corporation, Cambridge, Mass.

[22] Filed: Apr. 24, 1972

[21] Appl. No.: 246,703

[52] U.S. Cl. ............................................. 354/86
[51] Int. Cl. ......................................... G03b 17/50
[58] Field of Search ...................... 95/13, 14, DIG. 2

[56] References Cited
UNITED STATES PATENTS

| | | | |
|---|---|---|---|
| 3,650,188 | 3/1972 | Whall | 95/13 X |
| 3,683,770 | 8/1972 | Land | 95/13 |
| 3,653,308 | 4/1972 | Erlichman | 95/13 |
| 3,651,746 | 3/1972 | Land | 95/DIG. 2 |

*Primary Examiner*—Richard M. Sheer

[57] ABSTRACT

A compact collapsible self-developing camera system having a lens-shutter housing which is displaced from a storage position into an operative positive when the camera is rearranged from its collapsed into its extended condition. A film exit arrangement is offset with respect to the path the film normally assumes in leaving a pair of fluid spreading rollers and a light shielding plate is operative intermediate the rollers and the exit opening to deflect the film towards that exit arrangement. When operative, the light shielding plate further serves to reduce the amount of ambient light which would otherwise be incident upon processed sections of the film and to cooperate with an arrangement on the opposite side of the rollers therefrom to control the movement of a mass of processing fluid across exposed sections of the film unit. The lens-shutter housing displaces the light shielding plate from its operative position when the camera is collapsed so as to then occupy the space which the light shielding plate had occupied when in its operative position.

13 Claims, 10 Drawing Figures

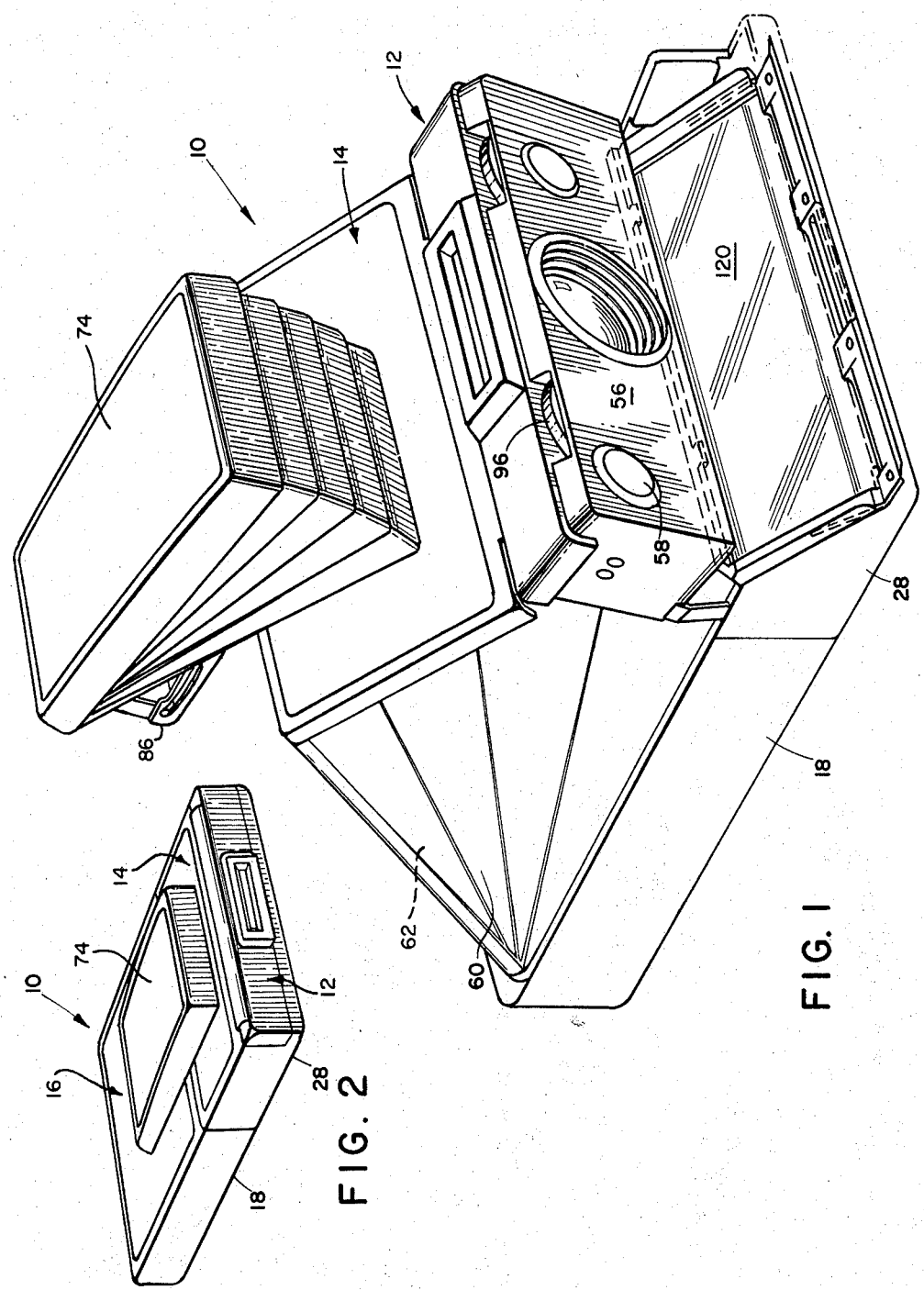

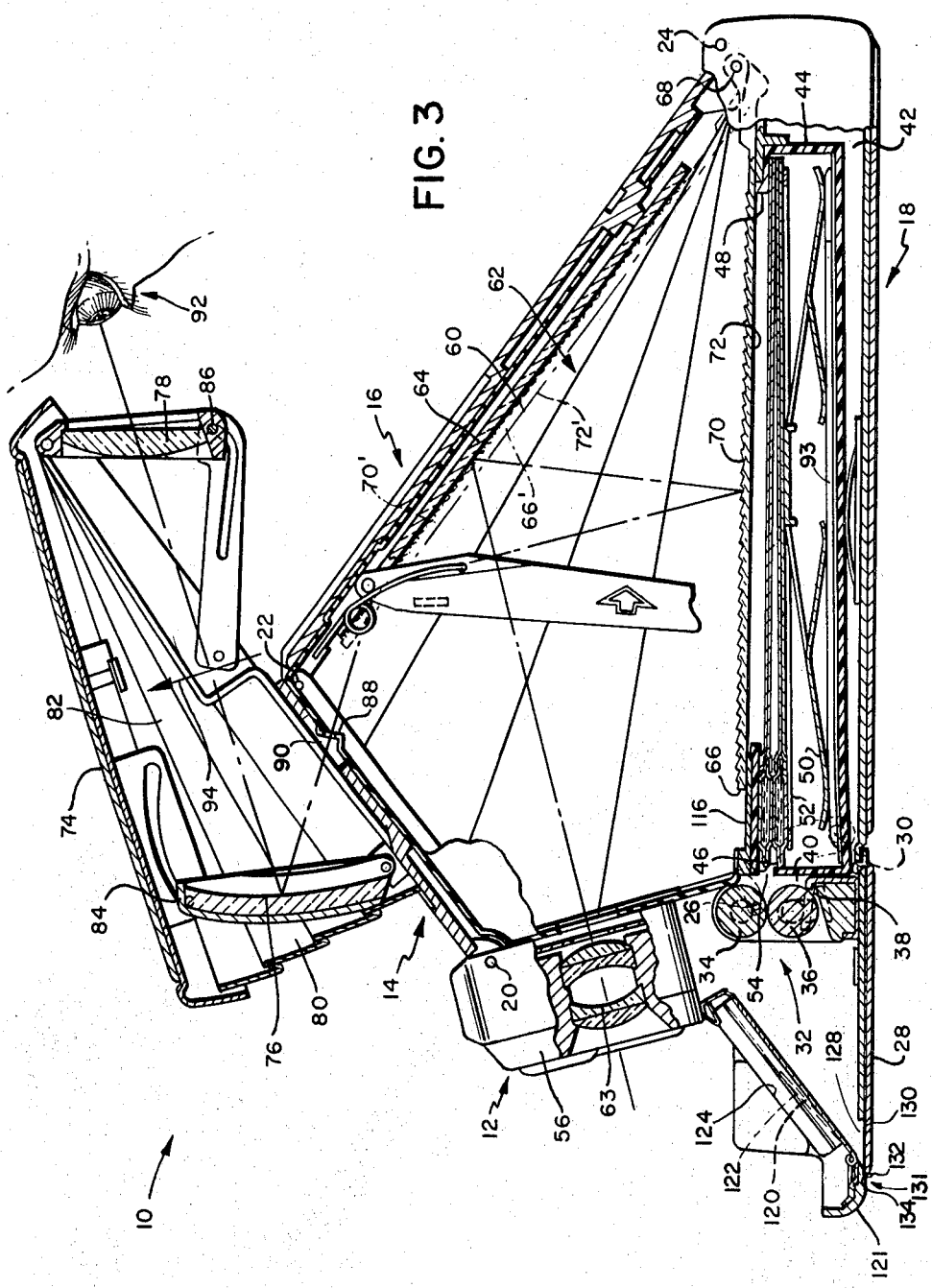

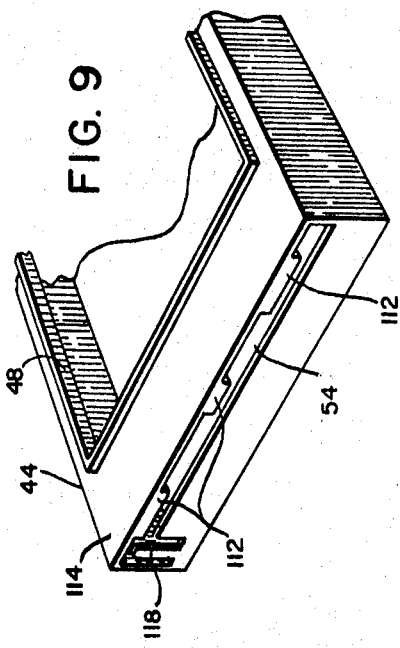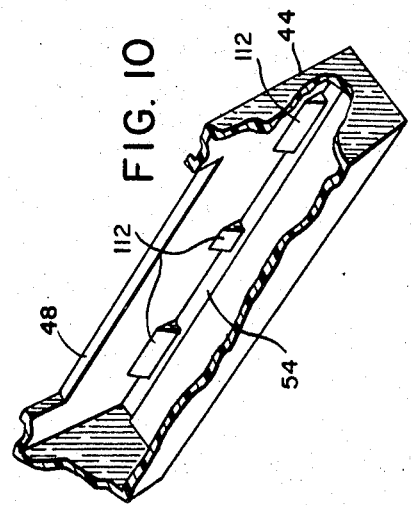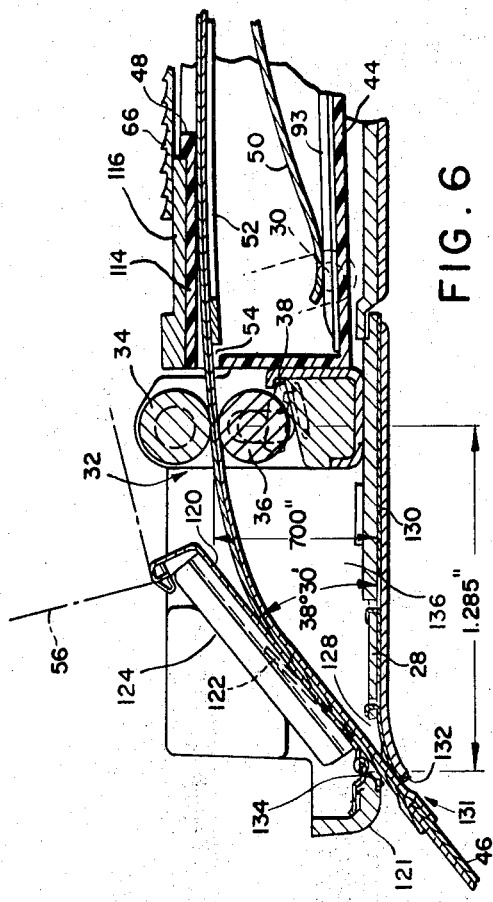

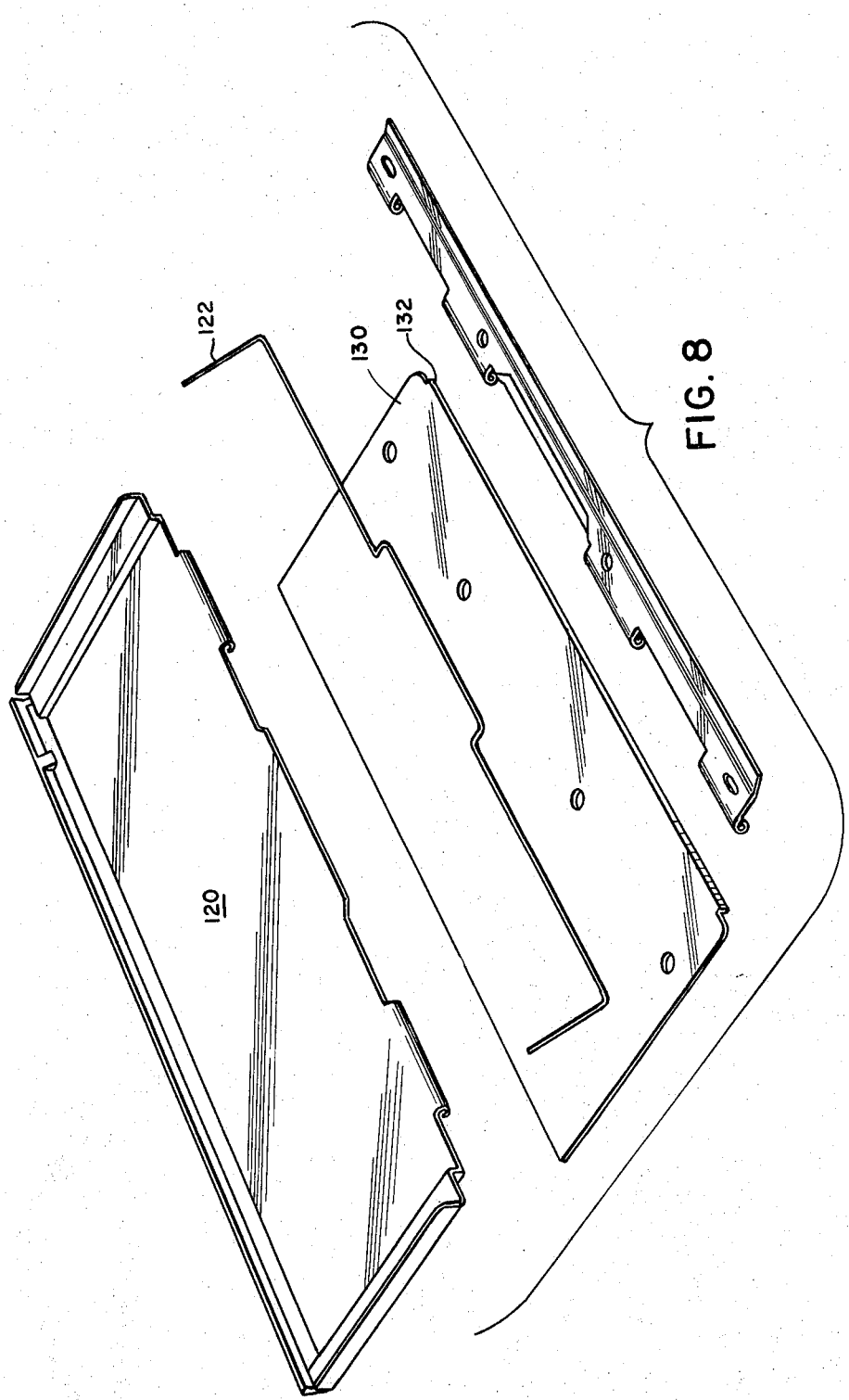

SELF-DEVELOPING CAMERA SYSTEM

BACKGROUND OF THE INVENTION

1. Field of the Invention

This invention relates to photography and, more particularly, to a compact system and apparatus for efficiently providing a high quality photographic record.

2. Description of the Prior Art

The advantages of cameras of the self-developing type are well recognized. Commercially available cameras of this type provide fully developed black-and-white photographs in approximately 15 seconds and fully developed photographs in full color in less than one minute. While customer interest in these products is a matter of proven record, it is apparent that the market for self-developing camera systems can be significantly increased by eliminating and/or improving certain characteristics of the presently offered products. For instance, it is desirable to further reduce the size of such camera systems whenever this can be accomplished without reducing the size of print which they produce. Also, as each photographic print is produced utilizing commercially available self-developing camera systems, the photographer typically has been required to dispose of a considerable amount of waste material. Such waste material normally includes pods, leaders, masks, bibs, traps, processed negative emulsion-bearing sheets, etc. This disposal task has proved to be somewhat of an inconvenience to the photographer and one which, in some instances, can be messy considering the fact that certain of these materials are wetted with processing fluid. It is therefore also apparent that the reduction or complete elimination of such waste materials will further enhance the marketability of self-developing camera systems. Obviously, the customer appeal of such systems will also be enhanced as the cost of these cameras and/or the cost of the film units employed in same is reduced.

Specially compact collapsible self-developing camera structures have been heretofore devised. Typical of such structures is that disclosed in U. S. Pat. No. 3,643,565 by Alfred H. Bellows entitled FOLDING CAMERA WITH DEVELOPING MEANS. That particular system permits a relatively large photograph to be produced by a camera, which when collapsed, is adapted to fit into the pocket of a man's suit. Another advantage of the camera system disclosed in the aforementioned U. S. patent is that it utilizes a substantially waste-free film unit. One type of film unit suitable for use with this prior art camera structure is disclosed in U. S. Pat. No. 3,415,644 by Edwin H. Land entitled NOVEL PHOTOGRAPHIC PRODUCTS AND PROCESSES.

One of the features of the camera of U. S. Pat. No. 3,643,565 which directly relates to its compactness is that it is designed to advance a section of the film unit which has been treated with processing fluid from the camera while a section of that film unit yet untreated with such fluid still remains within the camera housing. In order for such an arrangement to be possible, the aforementioned film unit includes a relatively thin, substantially light transmissive layer or element, which may comprise a polyester, such as a polymeric film derived from ethylene glycol terephthalic acid, or a cellulose derivative such as cellulose triacetate, defining an outside face or surface of the film unit, and a rupturable pod of processing fluid that includes an opacifying constituent. During exposure operations image-carrying light rays from the camera's lens pass through the transparent surface layer before impinging upon the photosensitive system of the film unit. As the film unit is subsequently advanced between a pair of spread rollers towards the film exit means of the camera, the spread rollers progressively distribute a mass of the processing fluid intermediate the transparent element and the photosensitive system of the film unit. Thus, those portions of the film unit progressively exposed to ambient light have been treated by the processing fluid with its opacifying constituent which precludes ambient light subsequently incident upon the transparent layer from reaching adjacent sections of the photosensitive system. Once the diffusion-transfer process has been completed, the developed image is viewable through the aforementioned transparent element.

One of the considerations in camera systems of the aforementioned type is a phenomenon generally referred to as "light-piping." More specifically, light-piping comprises ambient light incident upon any portion of the transparent material exteriorly of the camera during film processing operations being conducted thereby to portions thereof adjacent yet untreated sections of the exposed photosensitive system of the film unit. Such light rays can cause undesirable "fogging" of those yet untreated sections of the film unit's photosensitive system.

To understand this phenomenon more clearly, it should be recognized that the aforementioned film unit comprises an opaque dimensionally stable layer or support element positioned on the side of its photosensitive system opposed from its light transparent layer. Thus, once the processing fluid including its opacifying constituent has been spread across the photosensitive system, that photosensitive system is protected from ambient light incident upon the film unit, and its development process may therefore be completed when the film unit itself is exposed to ambient light. However, in the aforementioned camera arrangement, a fluid treated section of each such film unit is exposed to ambient light while a section thereof remains on the opposite side of the spread rollers within a light protected chamber of the camera and is yet untreated with the processing fluid. While at such times ambient light incident upon the transparent element of the fluid treated section of the film unit cannot pass through the layer of processing fluid to adjacent portions of the exposed photosensitive system, a portion of these light rays may be reflected internally of the light transparent element and scatter or diffuse lengthwise therealong into the light protected camera chamber until it reaches a point within the light transparent element in advance of the fluid mass being spread intermediate the film unit's transparent and photosensitive elements. Since there is no opacifying agent intermediate the light transparent element and the adjacent portion of the exposed photosensitive system at this point, these light rays will have the effect of further exposing, or "fogging" the yet untreated section of the photosensitive system.

One solution to this light-piping problem as disclosed in copending U. S. Pat. application Ser. No. 194,407 by Edwin H. Land entitled NOVEL PRODUCTS AND PROCESSES filed on Nov. 1, 1971 is to include an opacifying pigment in the light transparent or conducting element itself. Such an opacifying pigment may comprise carbon black particles in such amounts as to offer little resistance to light rays passing therethrough in its relatively thin (thickness) dimension, i.e., so as to not materially impair the ability to expose the photosensitive element therethrough nor the ability to subsequently view therethrough the final image produced in the image-receiving layer or element. However, at the same time the amount of such pigment is sufficient to substantially preclude ambient light from being piped lengthwise through the light transmissive element to sections thereof in advance of the processing fluid. In other words, when the camera lens is operative to expose the photosensitive system, the image-carrying light rays pass through a very thin section of the light transmissive element of the film unit and hence the opacifying pigment therein offers little resistance to such light rays. Similarly, the opacifying pigment does not materially affect the ability to view the final image through the transparent element in which it is retained. However, ambient light rays attempting to pass through the same light transmissive element of the film unit must be light-piped through a much larger distance thereof, i.e., in its lengthwise dimension, and hence the opacifying pigment is highly effective in precluding the passage of these light rays therethrough.

Aforementioned copending application Ser. No. 194,407 discloses densities of opacifying pigments employed in light transmissive elements of particular film units which have proven suitable for resolving the light-piping problem without materially diminishing the quality of the finished photographic print. However, it will be recognized that it is highly desirable to minimize the light resistant characteristic of the film unit's light transmissive element during normal film exposure operations and therefore desirable to minimize the density of the opacifying pigment in the light transmissive element whenever this can readily be accomplished while still precluding the light-piping phenomenon and without compromising the size of the camera structure. It is to this end that one aspect of the present invention is directed.

One of the major cost items associated with film units employed in self-developing cameras is the processing fluid which is distributed across the film unit's photosensitive system after exposure thereof to facilitate the development of a viewable image. It is obviously desirable to reduce the amount of processing fluid which must be included in each particular type of film unit to facilitate the production of a viewable image of a given size.

An important object of this invention, therefore, is to provide an improved arrangement for spreading a processing substance across photographic materials.

Another primary object of this invention is to provide an improved arrangement for precluding undesirable "fogging" of photographs produced with cameras of the self-developing type.

An additional object of the present invention is to provide an unusually compact unique arrangement for processing film units of the self-developing type.

Also an object of this invention is to provide processing apparatus for reducing the amount of processing fluid included in film units of the self-developing type.

SUMMARY OF THE INVENTION

In its illustrated embodiment, the present invention is incorporated in a particularly compact self-developing camera structure of the collapsible type. This camera utilizes film units which include a rupturable pod of processing fluid and a layer or element formed of a light transparent or transmissive material which defines an outside face thereof. A battery powered picking arrangement and spread roller assembly cooperate to advance each film unit from the camera after its exposure. Mounted for displacement between an operative position when the camera is in its extended condition and a storage position when the camera is in its collapsed condition, is a housing which mounts the camera's objective lens-shutter assembly. When in its latter position, i.e., its storage arrangement, this lens-shutter housing is disposed in front of the spread rollers adjacent a housing member which extends in front of and below those rollers.

This invention is particularly directed to a unique arrangement for deflecting each film unit as it emerges from the spread rollers and prior to its exiting from the camera structure and for light shielding a fluid treated portion of the film unit intermediate the camera's exit means and its rollers. In its illustrated embodiment, the invention includes an elongated film catcher exit means in the aforementioned housing member adjacent its leading edge and a specially configured opaque plate-like member pivotally connected to that housing member adjacent its leading edge and extending rearwardly towards the rollers. In its operative position, this opaque member serves to engage the film unit as it emerges from the rollers and to deflect it towards the exit means. Additionally, at such times it shades portions of the film unit's light transmissive element intermediate the spread rollers and the exit means from ambient light.

The light transmissive layer or element of the film unit may include an opaque pigment to preclude adverse fogging of exposed unprocessed sections of the film unit's photosensitive system due to light-piping. Thus the opaque plate-like member is adapted to cooperate with the opaque pigment in the film unit's light transmissive element to preclude light-piping therethrough, thereby permitting the amount of pigment employed in the film unit to be minimized without otherwise compromising the compactness of the camera structure. Also, since the film unit has an inherent stiffness, the opaque member serves to urge portions of the film unit still disposed on the opposite side of the rollers against components influencing the movement of the mass of processing fluid between adjacent layers or elements of the film unit, therefore controlling the movement of such mass of processing fluid. This latter function of the opaque plate-like member decreases the amount of processing fluid spread between adjacent elements of the film unit than would otherwise be the case if the path of the film unit were undisturbed as it emerged from the rollers.

Spring means are employed to continually urge the opaque or light shielding member towards its operative position. When the camera is rearranged from its extended condition into its collapsed condition, its lens-shutter housing engages the light shielding member and pivots it away from its operative position into a storage position adjacent the aforementioned housing member. Thus, when the camera is collapsed, its lens-shutter housing occupies space which had been occupied by the light shielding member when the camera was in its extended condition.

BRIEF DESCRIPTION OF THE DRAWINGS

The novel features that are considered characteristic of the invention are set forth with particularity in the appended claims. The invention itself, however, both as to its organization and its method of operation, together with other objects and advantages thereof, will be best understood from the following description of the illustrated embodiment when read in connection with the accompanying drawings wherein like numbers have been employed in the different figures to denote the same parts and wherein:

FIG. 1 is a perspective view diagrammatically depicting a collapsible self-developing camera disposed in its operative condition and incorporating the present invention;

FIG. 2 is a perspective view of the camera of FIG. 1 disposed in its collapsed or storage condition;

FIG. 3 is a diagrammatic, partially cut-away, side elevation view of the camera shown in FIG. 1;

FIG. 6 is an enlarged section of the camera as viewed in FIG. 3 illustrating a phase of the film processing operation;

FIG. 8 is an exploded diagrammatic presentation in perspective of the light shielding member of the present invention and certain components associated with its mounting and operation within the camera of FIG. 1; and FIGS. 9 and 10 diagrammatically represent fragmentary perspective views of the film unit container or magazine employed in the camera of FIG. 1.

DESCRIPTION OF THE ILLUSTRATED EMBODIMENT

Figure 4:
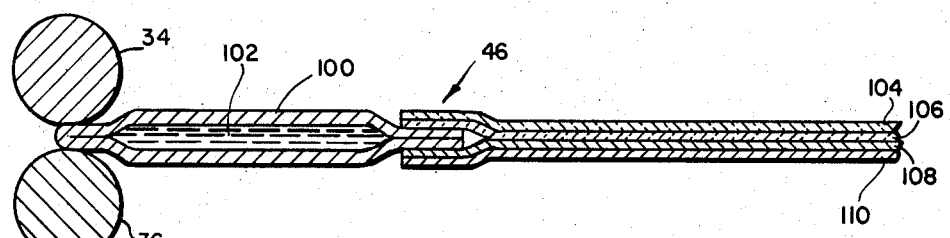
FIG. 4 constitutes a fragmentary diagrammatic side elevation view in section of a form of film unit suitable for use in the camera of FIG. 1.

In its illustrated embodiment, the present invention is depicted as being incorporated in a compact collapsible self-developing camera 10 which otherwise generally conforms to the camera structure disclosed and described in considerable detail in U.S. Pat. No. 3,714,879 by Edwin H. Land et al. entitled REFLEX CAMERA issued Feb. 6, 1973. This camera 10 is illustrated in its extended operative condition in FIG. 1 and in its storage or collapsed inoperative condition in FIG. 2. Referring now to those figures, and FIG. 3 of the drawings, it will be seen that the camera 10 includes a plurality of housing members 12, 14, 16 and 18 which are pivotally coupled to one another at pivots 20, 22, 24 and 26 for relative movement between the compact collapsed inoperative condition of FIG. 2 and the extended operative condition of FIGS. 1 and 3. Additionally, a housing member 28 extending in front of the housing member 18 is pivotally connected thereto at pivot 30 for movement in a counterclockwise direction as viewed in FIG. 3. In this connection, the housing member 28 mounts a spread roller assembly 32 including juxtaposed rollers 34 and 36, the latter roller 36 being resiliently biased towards the former by any suitable spring means 38. When the camera 10 is disposed in its extended condition of FIGS. 1 and 3, the spread roller assembly 32 is positioned across an entrance 40 to a film magazine receiving chamber 42. Consequently, the pivotal connection between the housing members 18 and 28 permits the latter to be displaced with respect to the former to remove the spread roller assembly 32 from its blocking position across the entrance 40 to facilitate the loading of the camera with a film magazine 44. Each such film magazine 44 includes a plurality of suitable film units 46 which may take the form of the previously described type. Additionally, each such film magazine 44 is provided with a picture framing aperture 48 which, when the magazine is appropriately positioned within the receiving chamber 42, is aligned with the optical system of the camera 10 to facilitate film exposure operations. Disposed within the film magazine 44 is a spring assembly 50 that acts against a plate 52 to continually urge the film unit 46 closest to the picture framing aperture 48 into the proper focal plane for exposure purposes. An elongated opening 54 is provided in the housing of the film magazine 44 to facilitate the advancement of each film unit 46 from the magazine towards the spread roller assembly 32 after its exposure.

The member 12 comprises a housing for the camera's lens-shutter assembly 56 and an actuator button 58 for initiating camera operations, and is adapted to rotate about the pivot 26 into a position (See FIG. 7) in front of the spread roller assembly 32 adjacent the housing member 28 when the camera is rearranged from its extended condition into its collapsed condition. When the camera is extended as shown in FIGS. 1 and 3, the housing members 12, 14, 16 and 18 cooperate with a collapsible bellows 60 secured thereto to form a six-sided exposure chamber 62.

In addition to an objective lens 63 mounted in the housing member 12, the camera's optical system includes a planar mirror 64 mounted on an interior wall of the housing member 16 to reflect light rays passing through the objective lens towards the camera's focal plane. A plate-like reflex member 66 is pivotally coupled to the housing member 18 at a pivot 68 for displacement between its position shown in FIG. 3 wherein it overlies the picture framing aperture 48 and its position shown in phantom in that figure of the drawings wherein it is disposed in overlying adjacency with respect to the planar mirror 64. This reflex member 66 includes a viewing surface 70 preferably comprising a suitable Fresnel configuration and a planar light reflective surface 72. The operation of this reflex member 66 will subsequently be set forth in more detail. The optical system of the camera 10 further includes a collapsible viewing device 74 appropriately mounted to the housing member 14. This viewing device 74 comprises a curved mirror 76, an eye lens 78 and appropriate housing structure, including telescoping blades 80 serving to define a viewing chamber 82 when the viewing device is extended. Appropriate linkages 84 and 86 are included with the viewing device 74 to respectively effect the erection of the curved mirror 76 and eye lens 78 into their operative positions responsive to the camera's being rearranged from its collapsed or storage condition into its extended operative condition.

This unique arrangement of optical elements provides the camera 10 with a single lens reflex characteristic wherein it is operated first in a viewing and focusing mode and thereafter in an exposure and processing mode. As best seen in FIG. 3, during the viewing and focusing mode of operation, the reflex member 66 rests in light-tight engagement over the film magazine's picture framing aperture 48. The camera's lens-shutter assembly 56 includes a normally opened shutter which, when the camera is extended, permits image-carrying light rays from the objective lens 63 to pass across the chamber 62 to impinge upon the mirror 64 that reflects such light rays onto the viewing surface 70 of the reflex member 66 whereon is thus formed an image of the scene to be photographed. Light rays emanating from the image formed on the viewing surface 70 of the reflex member 66 are directed upwardly therefrom to mirror 64 from which they are thence reflected towards the camera's housing member 14. As these light rays are reflected from the mirror 64, they pass first through a small aperture 88 in the bellows 60 that serves to define an entrance pupil for the viewing device 74, and then through a larger aperture 90 in housing member 14 to impinge upon the curved mirror 76. This curved mirror 76 includes a concave ellipsoidal shaped reflecting surface which redirects these light rays rearwardly through the lens 78 toward an eye station 92. A real, erect, and unreverted aerial image diagrammatically designated by an arrow 94 is formed by the concave mirror 76 and magnified by the eye lens 78 to facilitate viewing and focusing from the eye station 92. In this connection, the housing member 12 additionally serves to mount a focus control knob 96 (See FIG. 1) which may be manually rotated to effect an appropriate rearward or forward displacement of the lens 63.

To record an image of a subject on the forwardmost film unit 46, the camera's normally opened shutter is closed and the reflex member 66 pivoted into its position shown in phantom in FIG. 3. Thus, when the shutter is subsequently actuated, image-carrying light rays from the subject enter the camera's chamber 62 through the objective lens 63 and are reflected by the reflective surface 72 of the reflex member 66 onto the film unit 46 disposed across the picture framing aperture 48 of the film magazine 44.

To briefly summarize film exposure operations, the camera 10 is first arranged into its extended condition with the reflex member 66 positioned across the picture framing aperture 48 of the magazine 44. The photographer then views an aerial image of the subject through the eye lens 78 while adjusting the focus control knob 96. Once the image on the viewing surface 70 of the reflex member 66, as viewed through the viewing device 74, is in sharp focus, the photographer actuates the button 58 mounted on the housing member 12. Means (not shown) are included in the camera 10 which are responsive to the actuation of the button 58 to effect the following sequence of system operations. First, the normally open shutter closes and a blocking member (not shown) covers the aperture 88 in the bellows 60 causing the exposure chamber 62 to assume a light-tight condition. Next the reflex member 66 is pivoted upwardly within the chamber 62 into its position shown in phantom in FIG. 3 uncovering the picture framing aperture 48 and the film unit 46 most adjacent thereto. The camera's shutter is then opened to admit image-carrying light rays from the scene into the exposure chamber 62, which light rays are then reflected by the surface 72 of the reflex member 66 onto the forwardmost film unit 46 to effect the recording of a latent image therein. After an appropriate exposure interval, the shutter again closes, the reflex member 66 is returned to its initial position wherein it overlies the picture framing aperture 48 and the shutter and viewing device aperture 88 are opened. In connection with these opearations, it should be noted that the camera 10 includes an automatic exposure control system (not shown), which may take any suitable form, operable to automatically define the aforementioned appropriate exposure control interval. The power supply for the automatic exposure control system, for certain system operations previously described and for system operations yet to be described, may typically comprise a suitable battery 93 contained with each film magazine 44 or, alternately, provided within the camera 10 separate from the film magazine.

As previously implied, the film units of the types disclosed in aforementioned U. S. Pat. No. 3,415,644 and copending U. S. Pat. application Ser. No. 194,407 are typical of those suitable for use with the present invention. One form of such film units diagrammatically depicted in FIG. 4 of the drawings is particularly adapted for use with the illustrated embodiment of the present invention. In this context, it should be noted that the film unit 46 has an inherent stiffness and includes no waste materials, i.e., no materials which must necessarily be discarded by the photographer after the film unit has been exposed and processed. As supplied, the film unit 46 includes a rupturable pod 100 of processing fluid 102. Additionally, it includes a transparent or light transmissive layer or element 104, an image-receiving layer or element 106 and a photosensitive system or element 108, which element 108 may itself comprise a plurality of layers or elements, disposed on an opaque layer or support element 110. when the film unit 46 is disposed within the film magazine 44 adjacent the picture framing aperture 48 (See FIG. 3), its light transparent element 104 is disposed adjacent the reflective surface 72 of the reflex member 66. Thus, when the photographer depresses the button 58 (See FIG. 1) in part causing the reflex member 66 to assume its position shown in phantom in FIG. 3, the image-carrying light rays from the scene being photographed are directed through the film unit's light transparent element 104 and its image-receiving element 106 onto its photosensitive element 108. Subsequently, as the exposed film unit 46 is advanced from the film magazine 44 between the rollers 34 and 36, the compressive force exerted thereon by the rollers first effects a rupturing of the pod 100 and then the progressive advancement of the mass of fluid 102 initially retained therein lengthwise across the film unit intermediate its light transmissive element 104 and its photosensitive element 108, more specifically being actually disposed between its image-receiving element 106 and its photosensitive element 108. As previously indicated, a suitable opacifying constituent is included within the processing fluid 102 to preclude ambient light rays incident upon sections of the transparent element 104 after its emergence from the camera housing from contacting adjacent sections of the still photosensitive element 108. As is well known in the art, the processing fluid 102 coacts with the exposed photosensitive system to form a viewable image in the image-receiving element 106 by a diffusion-transfer process. It should be noted that the film unit 46 may comprise either a processing fluid 102 and an element 108 having a photosensitive system capable of cooperating therewith to produce either an image in the image-receiving element 106 which is viewable in black-and-white or an image in the image-receiving element which is viewable in full-color. The opacifying agent in the fluid 102 in combination with the opaque support 110 permits the processing operation to be completed while the film unit 46 itself is exposed to ambient light. The image thus produced in the image-receiving element 106 is viewable through the film unit's light transparent element 104.

As previously suggested and as will subsequently be discussed in more detail, the light transmissive element 104 of the film unit 46 may include an opaque pigment dispersed therethrough to alleviate undesirable fogging of untreated portions of the exposed film unit by the aforementioned light-piping phenomenon.

With respect to the advancement of the film units 46 from the film magazine 44 and through the rollers 34 and 36, the camera 10 also includes the aforementioned picking mechanism (not shown) and a gear drive (not shown) for the roller 34, both of which are suitably energized by the aforementioned battery 93 of the camera system. Suitable arrangements of these types are described in considerable detail in copending U. S. Pat. application Ser. No. 171,127 entitled FILM ADVANCING APPARATUS by Edwin H. Land filed Aug. 12, 1971. The picking mechanism engages the rear edge of an exposed film unit 46 and advances it from the magazine 44 through the magazine's opening 54 into the bite of the rollers 34 and 36. Once the leading edge of the exposed film unit 46 is engaged between the rollers 34 and 36, the drive roller 34 effects further advancement of that film unit from the camera 10. Preferably, operation of the picking mechanism and gear drive arrangement for the roller 34 is automatically responsive to the actuation of the button 58 (See FIG. 1) and sequenced to be energized immediately following the return of the reflex member 66 to its position wherein it overlies the picture framing aperture 48 (see FIG. 3).

Referring now to FIGS. 9 and 10 of the drawings, it will be seen that certain features of the film magazine 44 have been more clearly illustrated therein. In this respect, the film magazine 44 includes a plurality of specially configured and strategically located projections 112 which in part serve to define the magazine's elongated opening 54. The nature of, the function performed by, and alternate arrangements for this feature of the magazine 44 are set forth in considerable detail in copending U. S. Pat. application Ser. No. 246,701 by Richard R. Wareham et al. entitled PHOTOGRAPHIC PRODUCT AND APPARATUS filed concurrently with the present application. However, for our present purposes, it will be understood that as each exposed film unit 46 is advanced from the magazine 44, these projections exert a compressive force thereon at selected positions widthwise thereof. Thus, once the pod 100 of the film unit has been ruptured, these projections 112 are adapted to control the movement of the mass of processing fluid 102 between the image-receiving element 106 and the photosensitive element 108 of the exposed film unit 46 as it is advanced from the magazine 44. More specifically, they influence or serve to "flatten" the meniscus, i.e., the leading edge of the fluid mass widthwise of the film unit 46. Preferably, the film magazine 44 including its projections 112 is formed of an appropriate polymer such as polystyrene which is somewhat flexible when molded into a relatively thin structure. Under such circumstances, the portion 114 of the film magazine 44 from which the projections 112 depend, has an inherent flexibility. Thus, in order to preclude any undesirable flexing of this portion 112 of the magazine 44 during film processing operations, the camera 10 includes a rigid support member 116 against which the magazine portion 114 is seated when the magazine is properly positioned within the receiving chamber 42 of the camera. The magazine 44 is also preferably formed with a finger 118 which assures that only one film unit 46 at a time is advanced from the magazine 44 towards the rollers 34 and 36 responsive to operation of the aforementioned picking mechanism.

Figure 7:
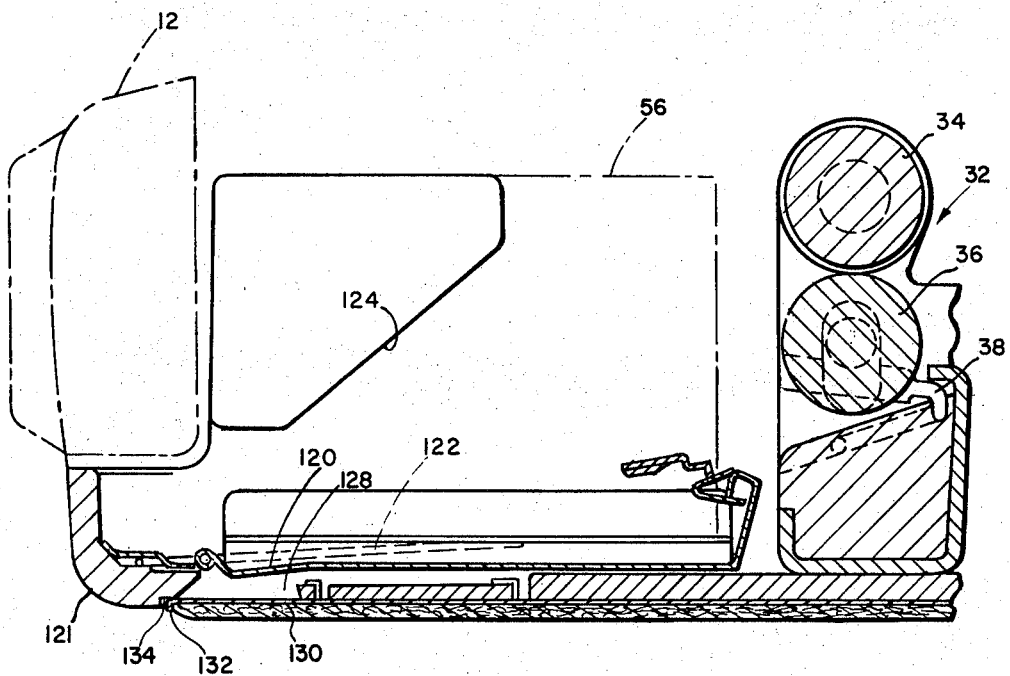
FIG. 7 constitutes a view of the section of the camera shown in FIG. 6 when the camera is disposed in its collapsed or storage condition.

As previously indicated, the present invention is particularly directed to the use of the opaque light shielding plate-like member 120, the nature and function of which may best be understood by now referring to FIGS. 6, 7 and 8. It will be recalled that the housing member 28 is pivotally connected to housing member 18 to facilitate the loading of a film magazine 44 into the camera 10 and its subsequent removal therefrom. This housing member 28 extends below and in front of the spread roller assembly 32. The light shielding plate 120 is pivotally connected to the housing member 28 adjacent its leading edge 121 by an elongated generally U-shaped spring 122 which continually urges that plate towards its operative position against a stop 124 (See FIG. 6). As the camera is rearranged from its extended condition into its collapsed condition, its lens-shutter housing 56 engages the light shielding plate 120 and effects a displacement thereof into its position depicted in FIG. 7. It will be noted that at such times, i.e., when the camera 10 is in its collapsed or storage condition, the lens-shutter housing 56 occupies at least a portion of the space occupied by the light shielding plate 120 when this latter component of the camera is in its operative position. Thus, it will be seen that provision has been made for the light shielding plate 120 without otherwise increasing the size of the camera 10 or complicating its operation.

The housing member 28 is formed with an elongated opening 128. Mounted to the member 28 so as to extend across its opening 128 is a resiliently flexible sheet metal component 130 which may be formed of any suitable material such as tempered steel (stainless and carbon), phosphor bronze, beryllium copper. It will be recognized that this sheet metal component 130 serves to provide the camera 10 with exit means 131 for each film unit 46 subsequent to its emergence from the spread roller assembly 32. In this respect, as the exposed film unit 46 is advanced from the spread roller assembly 32, it impinges upon the light shielding plate 120 which redirects its path of movement towards the sheet metal component 130 and more particularly towards the leading and free edge 132 thereof. In its normal position (See FIG. 7) the leading edge 132 of the component 130 is positioned in close adjacency to, and preferably seated against, the edge 134 of the opening 128 in the housing member 28. However, as the film unit 46 moves from the spread roller assembly 34 into engagement with the sheet metal component 130, it deflects that component away from the opening's edge 134 thereby permitting the film unit to exit from the camera 10 between the sheet metal component's deflected free edge 132 and the edge 134 of the housing member's opening 128. At the same time, once the film unit 46 has cleared the rollers 34 and 36, it is not permitted to fall out of the camera, since it is retained by the force of the sheet metal component 130 which presses it against the edge 134 of the opening 128. Also, the trailing edge of any film unit 46 so retained by the exit means 131 is seated against the plate 120. Thus, if a second film unit 46 should be exposed prior to removing the first film unit 46 from the exit means 131, its leading edge will engage the trailing edge of the first film unit and push that film unit through the exit means.

This unique arrangement has a number of highly important advantages over heretofore devised systems. First, at least a major portion of the light tranmissive element 104 of an exposed film unit 46 intermediate the spread roller assembly 32 and the camera's exit means 131 is shielded from ambient light by the plate 120. In this connection, while the chamber 136 is not completely light-tight, the light shielding plate 120 tends to "shade" the portion of the film unit's light transmissive element 104 disposed therein from ambient light. Thus, the intensity of ambient light rays incident upon that portion of the film unit's light transmissive element 104 is greatly reduced with respect to the situation which would exist absent the light shielding plate 120. This is an extremely important aspect of the present invention since the light shielding plate 120 co-operates with the opacifying pigment in the film unit's light transmissive element 104 to preclude undesirable fogging, by the aforementioned light-piping phenomenon, of those portions of the film unit 46 yet untreated with the processing fluid 102. In other words, it is no longer necessary for the opacifying pigment in the light transmissive element 104 to, by itself, carry this burden. Consequently, other factors remaining unchanged, the quantity of density of the opacifying pigment in the light transmissive element 104 may be reduced and still effectively preclude substantially any ambient light rays from being light-piped through that element 104 to exposed untreated postions of the film unit 46. Since the quantity of the opacifying pigment in the light transmissive element 104 can now be reduced or minimized, any adverse effect of that opacifying pigment on the transmission of image-carrying light rays focused by the camera's objective lens 63 to the film unit's photosensitive element 108 during film exposure operations, or on the ability to subsequently view the image developed in the image-receiving element 106 through the transparent element 104, is similarly reduced or minimized.

In this same context, another advantage is derived from this unique arrangement wherein the light shielding plate 120 deflects the exposed film unit 46, from the normal path it assumes in emerging from the spread roll assembly 32, towards the exit means 131 of the camera 10 which is disposed out of alignment with that normal path. More particularly, this arrangement permits a greater length of the film unit 46 to be shielded from ambient light within the confines of a housing structure of given size intermediate the spread roller assembly 32 and the camera's exit means than would be the case if the film unit 46, with its inherent stiffness, were permitted to substantially continue along its normal path as it emerged from the roller assembly towards an appropriately positioned exit means.

Certain dimensions have been indicated on FIG. 6 in order to impart a full understanding of the present invention and the advantages attendant therewith. However, it is to be expressly understood that these dimensions are exemplary only and are not to be interpreted as restricting the scope of the present invention in any manner.

Obviously, it is desirable that the various functions required to be performed by the camera 10 be accomplished with a minimum power drain on the camera's battery 93. Along these lines, it will be appreciated that the thickness of the layer of fluid 102 distributed between the image-receiving element 106 and the photosensitive element 108 of exposed film units 46 during film processing operations is a function of the compressive force exerted on the film unit as it passes between the spread rollers 34 and 36. At the same time, the power drain on the camera's battery is a function of the load on these spread rollers 34 and 36. Consequently, it has heretofore been found desirable to place a practical limit on the force of the spring 38 so as to not unduly load the camera's power source, and to compensate for this situation by providing a quantity of processing fluid 102 with each film unit 46 which is in excess of that actually required to process that film unit. The penalty paid for this compromise is an increased film unit cost.

Another factor influencing the thickness of the layer of processing fluid 102 spread between the image-receiving element 106 and the photosensitive element 108 of the film unit 46 is the compressive force exerted on the film unit in the area thereof in advance of the spread rollers 34 and 36, i.e., adjacent the camera's rigid support member 116 (See FIG. 3). More specifically, it has been found that the thickness of the fluid layer decreases as this compressive force is increased. In this respect it is believed that the shear rate of the fluid 102 increases as this compressive force is increased thereby producing a fluid layer of decreased thickness. This compressive force is a function of the force of the spring assembly 50. However, any attempt to further reduce the thickness of the fluid layer by increasing the force of the spring assembly 50 directly increases the power drain on the camera's battery. More specifically, the frictional forces which must be overcome by the camera's picking mechanism (not shown) in advancing an exposed film unit 46 from the magazine 44 into the bite of the rollers 34 and 36 are a function of the load exerted on the film units by the spring assembly 50.

One of the significant advantages of the present invention is that it provides means for controlling the movement of the mass of processing fluid 102 between the elements 106 and 108 of an exposed film unit 46 and therefore the thickness of the processing fluid layer spread therebetween without resorting to the undesirable expediency of either further increasing the load on the rollers 34 and 36 of the force of the spring assembly 50. This aspect of the present invention may best be understood by referring to FIG. 6 of the drawings. It will first be recognized that the camera's rigid support member 116 and/or the film magazine'portion 114 constitute means for restraining the movement of adjacent portions of an exposed film unit 46, under the influence of the spring assembly 50, in a direction transverse the direction of the relative motion between the film unit and the spread roller assembly 32. Since the film unit 46 has an inherent stiffness and is deflected downwardly by the light shielding plate 120 (See FIG. 6) away from the path it would otherwise follow in emerging from the spread roller assembly 32, an effect of that light shielding plate is to urge progressive sections of the film unit against the aforementioned restraining means of the camera system in advance of the spread roller assembly. Thus, the light shielding plate 120 effects a compressive force on the exposed film unit immediately in advance of the spread roller assembly 32 thereby effecting a reduction in the thickness of the layer of processing fluid 102 spread between the film unit's image-receiving element 106 and photosensitive element 108.

Obviously, the force with which the plate 120 urges the film unit 46 against adjacent portions of the film magazine 44 is a function of the extent to which that plate deflects the film unit. FIG. 6 depicts one particular arrangement which has provided satisfactory results. For instance, prior to the present invention, a particular camera system of the type illustrated effected the distribution of a layer of fluid on the order of .0026" in thickness between the image-receiving element 106 and the photosensitive element 108 of a FIG. 4 type of film unit 46. The image area of the film unit was on the order of 3.14 inches square and the total processing fluid employed was approximately .43 cubic cm. By incorporating a light shielding plate 120 – exit means 131 arrangement in that same camera structure, the thickness of the layer of fluid spread by the otherwise unchanged camera system was reduced to approximately .0024 inches and produced a photograph of the same quality. This constituted a savings of approximately .035 cubic cm. of processing fluid. In this instance the camera arrangement was similar to that depicted in FIG. 6. In this same context, the effect of the projections 112 of the magazine 44 (See FIGS. 9 and 10) in controlling the contour of the fluid meniscus is a function of the force by which the film unit 46 is pressed thereagainst. Consequently, the light shielding plate 120 additionally constitutes means for controlling the movement of the mass of fluid 102 across the film unit 46 in that it acts through the relatively stiff film unit to urge that unit against the projections 112.

Figure 5:
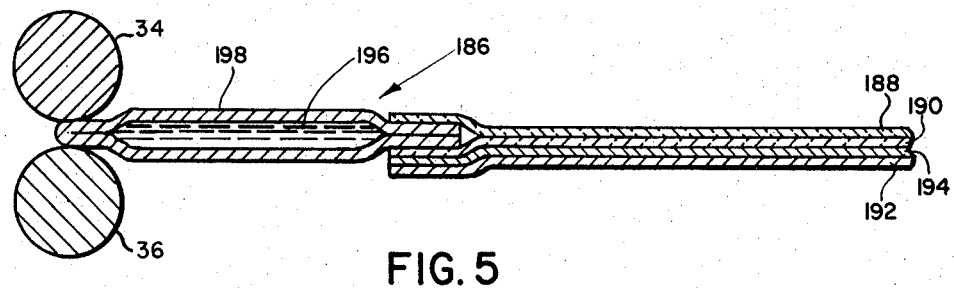
FIG. 5 constitutes a view similar to that of FIG. 4 of another form of film unit suitable for use with the present invention.

It will be recognized that the structural parameters per se of the film unit 46 provide for the formation therein of a transfer image upon exposure and processing which is viewable as a geometrically reversed image of the subject. Accordingly, to provide a transfer image formation which is not geometrically reversed when viewed, the camera 10 includes an image reversing optical system. Those skilled in the art will appreciate that the present invention is applicable for use with other types of film units and appropriately compatible camera structure. By way of example, another type of film unit suitable for use with the present invention is diagrammatically depicted in FIG. 5 of the drawings. This film unit 186 is described in considerably more detail in U. S. Pat. No. 3,594,164 by Howard G. Rogers entitled PHOTOGRAPHIC COLOR DIFFUSION TRANSFER PROCESS AND FILM UNIT USED THEREIN. As such, it comprises a light transparent or light transmissive element 188 through which its photosensitive element 190, that itself may comprise a plurality of layers or elements, is exposed to image-carrying light rays from the scene being photographed. An image receiving element 192 is spaced from the photosensitive element 190 by an opaque element 194. The light transparent element 188 of the film unit 186 may, for example, be formed of a material similar to that employed to form the element 104 of the film unit 46 of FIG. 4 including an opaque pigment to alleviate the light-piping problem. Additionally, the processing fluid 196 initially retained in the film unit's rupturable pod 198 may include an opaque constituent so that it presents an opaque layer between the light transmissive element 188 and photosensitive element 190 once it has been distributed therebetween. During the processing operation the fluid 196 effects the formation of a geometrically non-reversed viewable image in the image-receiving element 192 from the latent image initially recorded in the photosensitive element 190. Consequently, camera structure incorporating the present invention for use with this type of film unit 196 would not require an optical system capable of correcting for a right-left reversal of the viewable image.

Those familar with the photographic arts will readily appreciate the novel and highly unique advantages of this invention. It will also be recognized by those familiar with the photographic arts that the invention may be practiced or embodied in still other ways without departing from the spirit or essential character thereof. The embodiments illustrated herein are therefore illustrative and not restrictive, the scope of the invention being indicated by the appended claims and all variations which come within the meaning of the claims are intended to be embraced therein.

What is claimed is:

1. A self-developing camera system of the collapsible type for use with a film unit including a plurality of elements extending lengthwise thereof, one of said elements being initially photosensitive and at least one of said elements being a light transmissive outside surface defining element, said film unit serving to form a viewable image therein subsequent to exposure of its photosensitive element and the treatment thereof with a processing fluid, said camera system comprising:

first means for exposing said photosensitive element to image-carrying light rays;

second means for treating said exposed photosensitive element with said processing fluid responsive to said film unit's being advanced therepast;

third means, including exit means, for making a first section of at least said light transmissive element of said film unit accessible exteriorly of said camera whereby it is exposed to ambient light subsequent to its being advanced past said treating means while a second section thereof extends on the opposite side of said treating means from said exit means adjacent an untreated section of said exposed photosensitive element and for accommodating and light shielding a third section of said light transmissive element disposed intermediate said exit means and said untreated section of said exposed photosensitive element at such time to facilitate the preclusion of ambient light being transmitted through said light transmissive element to said exposed untreated section of said photosensitive element, said third means including a substantially opaque member mounted for selective displacement between an inoperative position and a position wherein it is operative to light shield said third section of said light transmissive element; and a component mounted for displacement into an operative position responsive to said camera system being rearranged from its collapsible condition into its extended condition and to occupy, when said camera system is in its collapsed condition, at least a portion of the space occupied by said opaque member when said opaque member is in its said operative position.

2. The camera system of claim 1 wherein said first means comprises a lens and said component comprises a housing for said lens.

3. A self-developing camera comprising:
means for receiving a film unit;
a housing member having film unit exit means;
means for exposing said film unit;
means for distributing a processing fluid across the exposed portion of said film unit responsive to said film unit's being progressively advanced therepast, said exit means being positioned with respect to said fluid distributing means so that, in the course of advancing said film unit after exposure thereof past said fluid distributing means and thence through said exit means, a first fluid treated section of said exposed film unit is accessible exteriorly of said camera and thus exposed to ambient light while a second section of said exposed film unit extends on the opposite side of said fluid distributing means from said exit means being yet untreated with said fluid, with another section of said exposed film unit being disposed intermediate said fluid distributing means and said exit means; and
means for light shielding at least a major portion of said other section of said exposed film unit at such time and for deflecting said exposed film unit from the path it would normally follow as it initially emerged from said fluid distributing means and guiding it towards said exit means.

4. The camera of claim 3 wherein a unitary element serves to light shield said major portion of said other section of said exposed film unit, to deflect said exposed film unit from the path it would normally follow as it initially emerges from said fluid distributing means and to guide said film towards said exit means.

5. A self-developing camera comprising:
means for receiving a film unit;
a housing member having film unit exit means;
means for exposing said film unit;
means for distributing a processing fluid across the exposed portion of said film unit responsive to said film unit's being progressively advanced therepast, said exit means being positioned with respect to said fluid distributing means so that, in the course of advancing said film unit after exposure thereof past said fluid distributing means and thence through said exit means, a first fluid treated section of said exposed film unit is accessible exteriorly of said camera and thus exposed to ambient light while a second section of said exposed film unit extends on the opposite side of said fluid distributing means from said exit means being yet untreated with said fluid, with another section of said exposed film unit being disposed intermediate said fluid distributing means and said exit means; and
an opaque member mounted for selective displacement between a first position wherein it is operative to light shield at least a major portion of said other section of said exposed film unit at such time and a storage position.

6. The camera of claim 5 wherein said opaque member is pivotally connected to said housing member to be disposed in overlying juxtaposed relationship with said housing member and its said exit means when said opaque member is in its said storage position.

7. A collapsible self-developing camera comprising:

means for receiving a film unit in position for exposure;
exit means through which said film unit may be advanced from said camera;
means for exposing said film unit;
a pair of juxtaposed fluid spreading rollers arranged to distribute a processing fluid across the exposed portion of said film unit as said exposed film unit is advanced therepast,
said exit means being positioned with respect to said rollers so that, in the course of advancing said film unit after exposure thereof between said rollers and thence through said exit means, a first fluid treated section of said exposed film unit is accessible exteriorly of said camera and thence exposed to ambient light while a second section of said exposed film unit extends on the opposite side of said rollers from said exit means being yet unteated with said fluid, with another section of said exposed film unit being disposed intermediate said rollers and said exit means,
an opaque light shielding plate-like member mounted for displacement between an erected position, wherein it is operative to light shield at least a major portion of said other section of said exposed film unit at such time, and storage position; and
means for automatically effecting the displacement of said plate-like member from one of its said positions into the other of its said positions responsive to said camera's being rearranged between its collapsed and extended conditions.

8. A self-developing camera comprising:
means for receiving a film unit;
a housing member having film unit exit means;
means for exposing said film unit;
means for distributing a processing fluid across the exposed portion of said film unit responsive to said film unit's being progressively advanced therepast, said exit means being positioned with respect to said fluid distributing means so that, in the course of advancing said film unit after exposure thereof past said fluid distributing means and thence through said exit means, a first fluid treated section of said exposed film unit is accessible exteriorly of said camera and thus exposed to ambient light while a second section of said exposed film unit extends on the opposite side of said fluid distributing means from said exit means being yet untreated with said fluid, with another section of said exposed film unit being disposed intermediate said fluid distributing means and said exit means, said exit means being disposed out of the path said exposed film unit would normally follow as it emerged from said fluid distributing means; and
means for deflecting said exposed film unit from the path it would normally follow as it initially emerged from said fluid distributing means and guiding it towards said exit means.

9. The camera of claim 8 wherein said housing member comprises a section defining the back of said camera and in which said exit means is disposed and said fluid distributing means is arranged so that said normal path of said film unit as it emerges therefrom is substantially parallel to said housing member setion.

10. The camera system of claim 8 wherein said exit means is arranged to exert a gripping force on the portion of said film unt disposed therein.

11. A photographic system comprising:
a film unit including:
  a supply of processing fluid; and
  a plurality of elements extending lengthwise thereof, at least one of said elements being initially photosensitive and at least one of said elements being formed of a light transmissive material located to at least in part define an exterior surface of said film unit, said light transmissive material including an opacifying pigment dispersed therethrough, said film unit serving to form a viewable image therein subsequent to exposure of its said photosensitive element and the treatment thereof with said processing fluid; and
a self-developing camera including:
  first means for exposing said photosensitive element to image-carrying light rays;
  second means for treating said exposed photosensitive element with said processing fluid responsive to said film unit's being advanced therepast; and
  third means, including exit means, for making a first section of at least said light transmissive element of said film unit accessible exteriorly of said camera whereby it is exposed to ambient light subsequent to its being advanced past said second means while a second section thereof extends on the opposite side of said second means from said exit means adjacent an untreated section of said exposed photosensitive element and for accommodating and light shielding a third section of said light transmissive element disposed intermediate said exit means and said untreated section of said exposed photosensitive element at such time to cooperate with said opacifying pigment of said light transmissive element to substantially preclude all ambient light incident upon said light transmissive element at such time from being light-piped through said light transmissive element to said exposed untreated section of said photosensitive element, said opacifying pigment contained in said third section of said light transmissive element being insufficient independent of said light shielding to preclude all ambient light incident upon said light transmissive element at such time from being light-piped through said light transmissive element to said exposed untreated section of said photosensitive element.

12. The system of claim 11 wherein said third means includes means for deflecting at least one such element of such film unit towards said exit means.

13. The system of claim 11 wherein said third means includes an opaque light shielding means mounted for selective displacement between an inoperative position and an operative position wherein it is effective to light shield such third section of such light transmissive element of such film unit.

* * * * *